June 28, 1966 J. H. SEARCY 3,258,538

ELECTRONIC MULTIPLEXER WITH SIGNAL OFFSET MEANS FOR HIGH SPEED COMMUNICATION OF LOW LEVEL SIGNALS

Filed June 20, 1962 2 Sheets-Sheet 1

INVENTOR

John H. Searcy

BY Stevens, Davis, Miller & Mosher

ATTORNEYS

INVENTOR
John H. Searcy
BY Stevens, Davis, Miller & Mosher
ATTORNEYS

United States Patent Office 3,258,538
Patented June 28, 1966

3,258,538

ELECTRONIC MULTIPLEXER WITH SIGNAL OFFSET MEANS FOR HIGH SPEED COMMUNICATION OF LOW LEVEL SIGNALS

John H. Searcy, Fort Lauderdale, Fla., assignor to Systems Engineering Laboratories, Inc., Fort Lauderdale, Fla., a corporation of Florida

Filed June 20, 1962, Ser. No. 203,818
17 Claims. (Cl. 179—15)

This invention relates to electronic multiplexers for high speed commutation of low-level signals, and more particularly, to a variable offset for the individual signals being processed in time sequence by a single amplifier.

In the past attempts to multiplex low-level signals, such as those generated by thermocouples or other similar transducers, have not been completely satisfactory due to loss in intelligence between the input terminals of the multiplex channels and the common output of the system. One important problem in a low-level multiplexer is signal offset due to the differences in the pedestals of low-level transistor gates employed in signal processing. The pedestal of a transistor switch is a function of the base drive. The exact manner in which the pedestal varies with base drive depends on the type of transistor, but, in general, as drive increases, pedestal increases.

According to the present invention a zeroing technique is provided wherein an A.-C. signal is introduced into the multiplex amplifier similar to the low-level gate signal. The low-level gate, by its chopping action, converts analog information into a phase-sensitive suppressed carrier signal. This signal can be easily duplicated by a potentiometer across a push-pull, low-level gate driver with the position of the movable tap of the potentiometer representing the amplitude and polarity of the analog signal. If the movable tap of the potentiometer is to one side thereof, a chopped wave form of one polarity is obtained. As the movable tap is moved in the other direction, the wave form decreases in amplitude to zero. Further advancement of the center arm causes the wave form to increase again but in the opposite polarity. As far as demodulation is concerned, this wave form looks like an offset in the gate and can be used to correct offset. This correction signal is symmetrical and, hence, can be A.-C. coupled into the amplifier without upsetting D.-C. levels. Since the zero correction occurs in the amplifier, and from an essentially constant resistance network, it has negligible effect on gain or CMR. CMR is the common term used for "common mode rejection," which is the ability of an amplifier or similar device to differentiate between a differential potential present in the incoming signal and a common voltage present on this signal. The correction signals are easily obtainable in proper time sequence from low-level gate drivers of the type disclosed in my copending application Serial No. 140,469, filed September 25, 1961, now Patent No. 3,070,662. The zero potentiometers at the same time provide the necessary damping to the gate driver transformers. By matching the low-level gate transistors, the required range of the zero control can be reduced and more channels accommodated per amplifier.

It is therefore an object of this invention to provide a method of offsetting signals for signal conditioning generally without inserting a degrading element in the series signal path.

It is another object of this invention to provide a system having a large dynamic offsetting range without degrading the signal.

It is still another object of this invention to provide independent and isolated offsetting of a multiplicity of channels so that each channel may be individually offset and yet coupled to the same amplifier.

These and other objects of the invention will become more apparent from the following detailed description of a preferred embodiment of the invention as applied to a low-level multiplexer, wherein.

Figure 1:
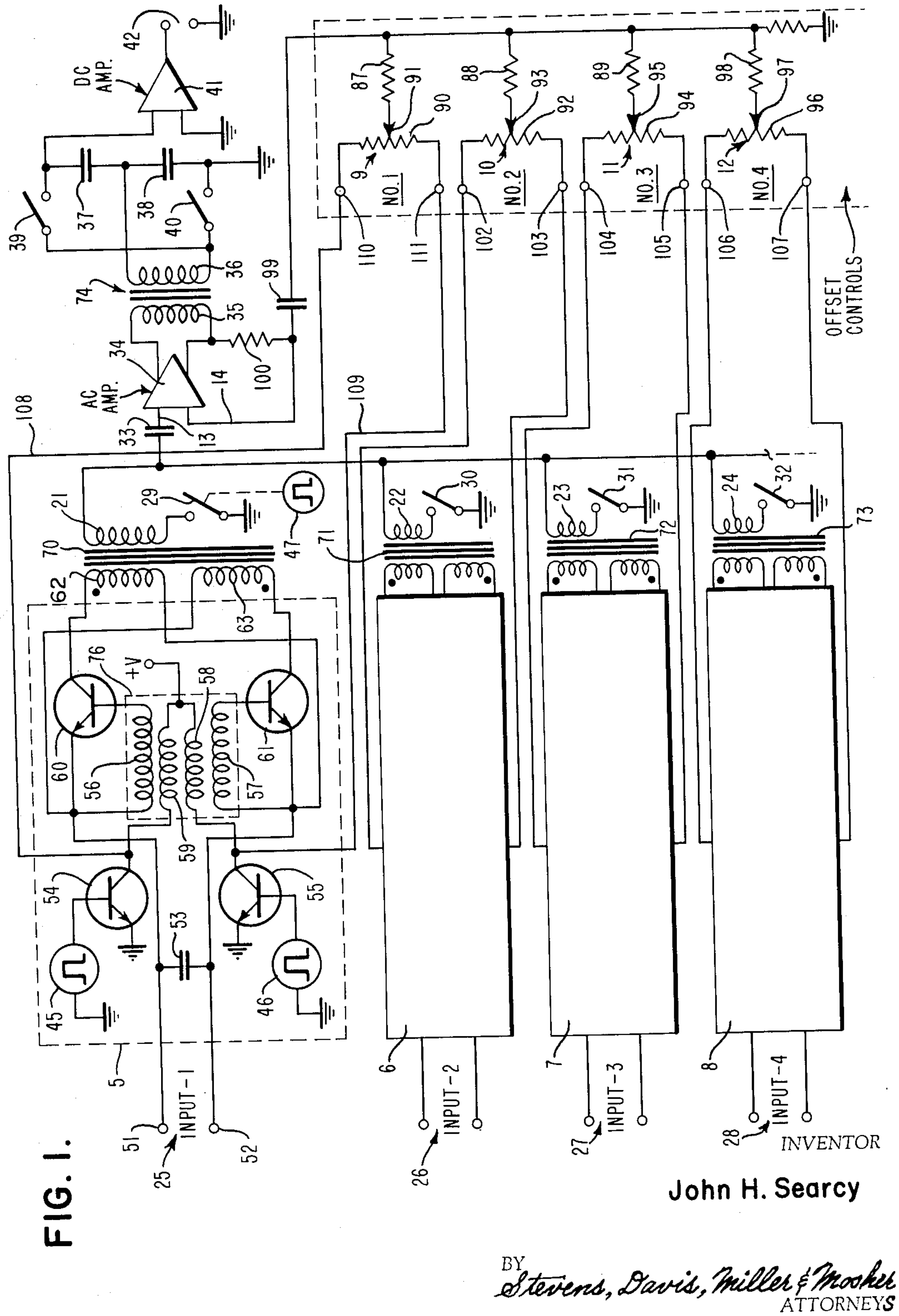
FIGURE 1 is a schematic diagram of a preferred embodiment of the present invention.

Referring to FIGURE 1, the schematic diagram of a preferred form of the invention, the circuit comprises four identical signal channels 25, 26, 27 and 28, each connected to a low-level input signal source designated as input 1, 2, 3 and 4, respectively. The input signal sources may be thermocouples or similar low-level signal producing means.

Each signal channel is connected to a gating circuit 5, 6, 7 and 8. Each gating circuit 5, 6, 7 and 8 is coupled to a variable offset control circuit 9, 10, 11 and 12, respectively. The gating circuit 5 and variable offset control circuit 9 will be described in detail; however, it should be understood that the gating circuits 6, 7, and 8 are identical to gating circuit 5 and the variable offset circuits 10, 11 and 12 are identical to variable offset control 9.

The gating circuit 5 of the channel 25 comprises four N-P-N transistors 54, 55, 60 and 61. The base of the transistor 54 is coupled to ground through a source of periodic signal pulses. The emitter of the transistor 54 is coupled to ground while the collector thereof is coupled to a source of positive voltage V through the primary winding 59 of the transformer 76.

The base electrode of the transistor 55 is coupled to ground through a source of periodic signal pulses 46 and the emitter electrode thereof is coupled to ground. The collector electrode is coupled to the source of positive voltage V through the primary winding 58 of the transformer 76. The emitter electrode of the transistor 60 is coupled to the input terminal 51 and also to the base electrode of the transistor 60 through the secondary winding 56 of the transformer 76. The emitter electrode of transistor 60 is connected to the collector electrode of transistor 61 through the primary winding 63 of the transformer 70. The collector electrode of the transistor 60 is coupled to the emitter electrode of the transistor 61 through the primary winding 62 of the transformer 70. The primary windings 62 and 63 are oppositely wound. The emitter electrode of the transistor 61 is coupled to the base electrode of said transistor through the secondary winding 57 of the transformer 76, the emitter electrode also being coupled to the input terminal 52. The input terminals 51 and 52 are coupled by means of a capacitor 53. Transistors 60 and 61 may be pre-matched for collector-emitter voltage drop.

The gating circuit 5 operates in the following manner: In a first time period *b* (FIG. 2), a signal pulse from the source 45 causes the transistor 54 to become conductive and thereby places a potential difference between the emitter electrode and the base electrode of the transistor 60. This will provide a complete signal path from the input 51 through the transistor 60, the primary winding 62 and the input terminal 52.

During a second time interval *c* (FIG. 2,) the source of pulses 45 will be off while the source of pulses 46 will be turned on. Thereby, the transistor 55 will be conductive and cause current to pass through the winding 58 and the transformer 76. The presence of current in the winding 58 will cause current to be impressed upon the winding 57 and make the transistor 61 conductive. Accordingly, a complete signal path can now be traced from the input terminal 51, through the primary winding 63, the transistor 61 and the input terminal 52.

The transformer windings are polarized to cause a flux reversal and A.-C. voltage to be induced across the windnig 21.

The gating circuits 6, 7 and 8 of the channels 26, 27 and 28, respectively, operate in the same manner as the gating circuit 5.

The signals in the secondary windings 21 to 24 are coupled to a common A.-C. amplifier 34 through a coupling capacitor 33 by the closure of switches 29, 30, 31 and 32, each of said switches coupling one of the secondary windings to ground upon closure thereof.

The switch 29, which can be, for example, a transistor or a relay, can be closed by a pulse from the generator 47. The pulse produced by the pulse generator 47 will extend through the time intervals *b* and *c* and *j* and *k* (FIG. 2) to close the switch 29 during these time intervals. Similarly, pulse generators (not shown) will close the switches 30, 31 and 32 during the other time intervals set forth in FIGURE 2.

The alternating signals from the secondary windings are transferred through the coupling capacitor 33 to the input terminal 13 of the A.-C. coupled amplifier 34 to amplify the signals from a low-level to a high-level value. The use of an A.-C. rather than a D.-C. amplifier with a modulated common time division multiplex signal of low-level is entirely advantageous because there is no drift associated therewith.

The output signal from the A.-C. amplifier 34 is applied to the primary winding 35 of the transformer 74. This signal is transferred to the secondary winding 36 of the transformer and is thereby switched alternately across the capacitors 37 and 38 at times to coincide with the switching action of the input transistor switches (such as 60 and 61, respectively). This switching is accomplished by means of the alternate closure of the switches 39 and 40 in synchronism with the switches 60 and 61. These capacitors (37 and 38) function as a holding or storage device for the peak A.-C. signals applied thereto.

Accordingly, switches 39 and 40 and capacitors 37 and 38 serve as a synchronous rectifier for the A.-C. signal applied thereto. The output voltage obtained across capacitors 37 and 38 is applied to a D.-C. amplifier 41, the output of which is a time division multiplex signal of the input signals which have been amplified without distortion, drift or noise. The amplifier 41 is of standard design having high input impedance and low output impedance to enhance matching with a suitable load.

For a D.-C. input to the amplifier 34, resistor 100, coupled between the output terminal 101 of the amplifier 34 and the input terminal 14 thereof is the only feedback network and essentially provides unity feedback, thus producing a gain of 1 at D.-C.

The variable offset control network of the signal channel 25 includes a first conductor 108 coupled between the collector electrode of the transistor 54 and the terminal 110 and a second conductor 109 connected between the collector electrode of the transistor 55 and the terminal 111. The terminals 110 and 111 are coupled across the terminals of a potentiometer 90. The movable tap 91 of the potentiometer 90 is coupled through a resistor 87 and a capacitor 99 to the input terminal 14 of the A.-C. amplifier 34. In a similar manner the terminals 102 and 103 of the channel 26 are coupled across a potentiometer 92 and through the movable tap 93 and resistor 88 and the capacitor 99 to the input terminal 14. In the identical manner, the terminal 104, 105, 106 and 107 of the channels 27 and 28 are connected through the potentiometers 94 and 96 of the resistors 89 and 98 to the input terminal 14 of the amplifier 34 through the capacitor 99.

Figure 3:
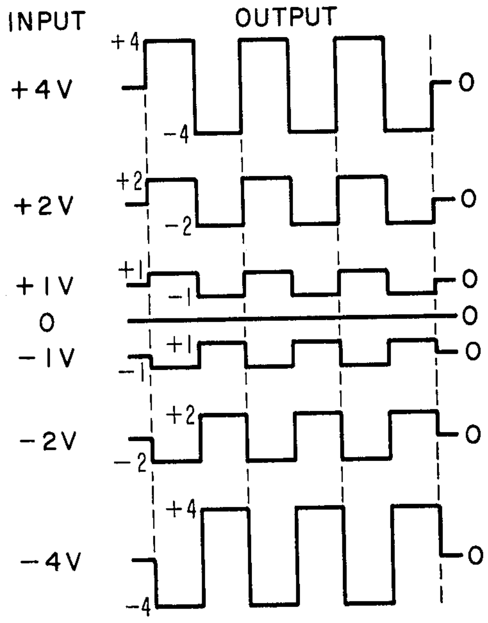
FIGURE 3 is a timing diagram illustrating the manner of deriving the variable offset.

The signal provided by the offset control circuit is an A.-C. signal which is generated during and only during the time that an individual gate is operative. For example, the potentiometer 90 is driven by two square waves 180° out of phase, one being derived from the transistor 54 and applied to terminal 110 and the other being derived from the transistor 55 and applied to terminal 111. When the tap 91 is at the center position of potentiometer 90, then the output will be zero since the wave forms will cancel. However, as the tap 91 is moved up from center, a square wave of one phase will be obtained, the amplitude of which will be directly proportional to the position of the tap 91. As the tap 91 is moved through the center position and down, the output from the potentiometer 90 will go to zero and start to increase again, but 180° out of phase with respect to the signal when the tap 91 is in the upper position. FIGURE 3 illustrates the outputs from potentiometer 90 for several positions for tap 91.

The output signal pulses are applied through the capacitor 99 to the amplifier terminal 14 by the tap 91. As noted, the voltage wave forms of FIGURE 3 are amplitude adjusted by positioning of the center tap 91, 93, 95 or 97 of the potentiometers 90, 92, 94 and 96 to provide adjustable signals via resistors 87, 88, 89 and 98. It is again repeated that an output voltage appears only during a channel activation time and can thus be combined with the input signal at the input terminal 13 of the amplifier 34 to provide an offset.

The input signal can be offset in both the positive or negative directions since the position of the movable taps 91, 93, 95 and 97 determine the polarity and amplitude with respect to the signal voltage applied to the input terminal 13 as can be evidenced from FIG. 3.

Figure 2:
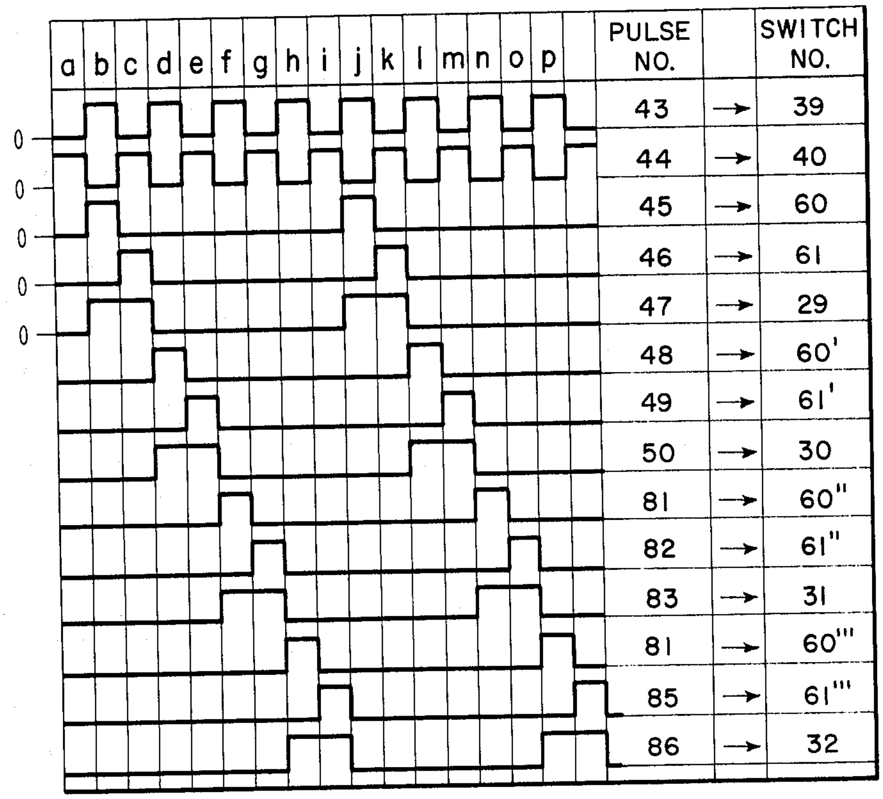
FIGURE 2 is a timing diagram of the preferred embodiment of the invention of FIGURE 1.

The operation of the system disclosed in FIGURE 1 is best understood by reference to the timing diagram illustrated in FIGURE 2.

FIGURE 2 discloses a timing diagram which includes a plurality of rectangular signal pulses 43 through 50, and 81 through 86. A positive-going signal pulse during one of these time periods will signify the closure of the switches indicated. The switches could be, for example, transistors which are rendered conducting by a positive pulse at times indicated in FIGURE 2 to act as "open" or "closed" switches.

Reference to FIGURE 2 discloses that in the time period *b*, the signal 43 is positive, thereby closing switch 39. Also, signals 45 and 47 are positive, thereby closing the switches 60 and 29. During this time period, input signal pulses will travel from the terminal 51 through the switch 60 and the primary winding 62 and back to the second terminal 52 of the input 1. A signal pulse will thereby be placed on the secondary winding 21 of the transformer 70 since the secondary winding has been connected to ground through the switch 29. This signal travels through the coupling capacitor 33 to the A.-C. amplifier 34 wherein it is amplified and transferred to the primary winding 35 of the transformer 74. This signal will be passed to the secondary winding 36 and charged to capacitor 37, the switch 39 having been closed.

Simultaneously, during the time period *b*, the square wave voltage (substantially zero volts) on the collector electrode of the transistor 54 will be placed on the terminal 110 and the positive (plus V) voltage on the collector electrode of the transistor 55 will be placed on terminal 111. If tap 91 is off center, a square wave output will be derived from potentiometer 90 and passed through the resistor 87 and the capacitor 99 to the input terminal 14 of the amplifier 34.

During the time interval *c*, the switches 40, 61 and 29 will be closed, the remaining switches being held open. Accordingly, an input signal will travel from the terminal 51 to the primary winding 63 and then from the switch 61 back to the second terminal 52 of the input 1. This signal will be of opposite polarity to the signal at the input of the transformer 70 during the time period *b* since the primary windings are oppositely poled. The signal is transferred to the secondary winding 21, one terminal of which has been coupled to ground through the switch 29, the signal passing through the coupling capacitor 33 to the A.-C. amplifier 34 and then to the primary winding 35 of the transformer 74. The signal is then transferred to the secondary winding 36 and charges the capacitor 38 through the closed switch 40. It should be noted that in time period *c* the voltage across the secondary winding 36 will be of opposite polarity to the voltage during time interval *b*. Therefore, the capacitor 38 will be charged in a direction opposite to that of capacitor 37. Accordingly, the voltage across the sum of the two capacitors will be the combination of the two input voltage signals in the time intervals *b* and *c*. This voltage is then transferred through the D.-C. amplifier 41 to the output terminals 42.

Simultaneously, during the time interval *c*, the square wave voltage of the collector electrode of the transistor 55 and the square wave voltage on the collector electrode of the transistor 54 will be placed on terminals 111 and 110, respectively. If tap 91 is off center, a signal will pass through the capacitor 99 and be impressed upon the input terminal 14 of the A.-C. amplifier 34 to provide offset in the same manner as during time interval *b*.

In a similar manner, the channels 26, 27 and 28 will be operated sequentially with channel 25 by the sequential opening and closing of the transistor switches 60′, 61′ and the switches 30, 39 and 40 for channel 26; the transistor switches 60″, 61″ and the switches 31, 39 and 40 for the channel 27; and the transistor switches 60‴, 61‴ and the switches 32, 39 and 40 for the channel 28 by the appropriate signal pulse as set forth in FIGURE 2.

It should be noted that each of the switches set forth could preferably be a transistor which is rendered conductive by a pulse on the control electrode thereof at the proper time. Therefore, the pulses 43 to 50 and 81 to 86 in FIGURE 2 would be clocked pulses produced in the time relation set forth to operate the respective transistor switch.

It should be understood that the switching rate of the switches at the input terminals will be somewhat greater than the frequency of the changes in voltage level at the input terminals in order that the magnitude of the positive and negative waves will be substantially the same.

It should also be understood that the P-N-P transistors can be used in place of the N-P-N and transistors disclosed by merely making the required circuit alterations to accommodate the P-N-P transistors.

Though the invention has been described with respect to a specific embodiment, many variations will be obvious to those skilled in the art. Accordingly, it is the intention to be limited only as indicated by the scope of the following claims which are to be interpreted as broadly as possible in view of the prior art.

What is claimed is:

1. A multiplex system comprising means having input means and output means to provide a signal related to the difference between a first and second input signal, a plurality of input signal channels, each channel including coupling means to couple said input means for providing a chopped input signal at a predetermined chopping frequency, adjustable means coupled to said input means for providing an input signal in synchronism with said chopped signal and at said chopping frequency, and means for sequentially coupling each of said coupling means for providing chopped input signals to said input means whereby an indication of the difference between said chopped signals is provided at said output means, said adjustable means comprising a variable impedance, a switch operating in synchronism with said chopped signal and at said chopping frequency connected across said variable impedance, said switch comprising a pair of transistors, each transistor having an input electrode and an output electrode and means coupled to each of said input electrodes for sequentially rendering each of said transistors conductive, said output electrodes being coupled across said variable impedance.

2. A multiplex system comprising means having input means and output means to provide a signal related to the difference between a first and second input signal, a plurality of input signal channels, each channel including coupling means to couple said input means for providing a chopped input signal at a predetermined chopping frequency, adjustable means coupled to said input means for providing an input signal in synchronism with said chopped signal and at said chopping frequency, and means for sequentially coupling each of said coupling means for providing chopped input signals to said input means whereby a signal related to the difference between said chopped signals is provided at said output means, said adjustable means comprising a variable impedance, a switch operating in synchronism with said chopped signal and at said chopping frequency connected across said variable impedance, said variable impedance being a potentiometer, said switch comprising a pair of transistors, each transistor having an input electrode and an output electrode and means coupled to each of said input electrodes for sequentially rendering each of said transistors conductive, said output electrodes being coupled across said variable impedance.

3. An electric circuit having two input terminals and an output terminal; an amplifier stage coupled to said output terminal; a common mode rejection and gating stage, having a pair of actuating switches connected to ground, coupled between said two input terminals and the input of said amplifier stage and, in response to the sequential actuation of each said switches, supplying to said amplifier stage in time sequence first with one polarity and then with an opposite polarity the difference in input signals at said two input terminals; a voltage source coupled to said common mode rejection and gating stage and also coupled to said switches; and a variable offset control circuit coupled between said switches and the input side of said amplifier stage, said variable offset circuit comprising variable means for feeding a portion of the voltage thereacross to the input side of said amplifier stage, each of said switches coupled to an opposite end of said variable means for feeding said voltage source voltage thereto when said switch is open and ground thereto when said switch is closed.

4. A circuit as set forth in claim 3, wherein said offset control circuit comprises an adjustable impedance.

5. A circuit as set forth in claim 4, wherein said common mode rejection and gating stage comprises a signal chopping means.

6. A circuit as set forth in claim 5, wherein said chopping means comprises at least two parallel signal paths coupled to said two input terminals, and gating means connected in said signal pattern for controlling individual opening and closing of said parallel signal paths.

7. A circuit as set forth in claim 6, wherein said gating means comprises transistors, at least one of said transistors in signal series with each said parallel paths, and one of said switches connected to each said transistor for rendering it conductive at the desired chopping frequency.

8. A circuit as set forth in claim 7, wherein said switches comprise at least two trigger transistor switches sequentially driven at the desired chopping frequency and coupled to said transistors.

9. A multiplex system comprising a plurality of signal channels, an indicating amplifier comprising input and output means, each of said plurality of signal channels coupled to said input means of said amplifier stage, each of said plurality of signal channels having two input terminals and comprising a common mode rejection and gating stage, having a pair of actuating switches connected to ground, coupled between said two input terminals and the input means and, in response to the sequential actuation of each of said switches, supplying to said input means in time sequence first with one polarity and then with an opposite polarity the difference in input signals at said two input terminals, a voltage source coupled to said common mode rejection and gating stage and coupled to said switches, and a variable offset control circuit coupled between said switches and said input means, said variable offset circuit comprising variable means for feeding a portion of the voltage thereacross to said input means, each of said switches coupled to an opposite end of said variable means for feeding said voltage source voltage thereto when said switch is open and ground thereto when said switch is closed.

10. A multiplex system as set forth in claim 9 wherein said offset control circuit comprises an adjustable impedance.

11. A multiplex system as set forth in claim 9 wherein each said common mode rejection and gating stage comprises signal chopping means.

12. A multiplex system as set forth in claim 11 wherein said signal chopping means comprise at least two parallel signal paths coupled to said two input terminals, and gating means for controlling the individual opening and closing of said parallel signal paths.

13. A multiplex unit as set forth in claim 12 wherein said gating means comprises transistors, at least one of said transistors in signal series with each said parallel paths, and one of said switches connected to each said transistor for rendering it conductive at the desired chopping frequency.

14. A multiplex system as set forth in claim 13 wherein said switches comprise at least two trigger transistor switches sequentially driven at the desired chopping frequency and coupled to said transistor.

15. A multiplex system as set forth in claim 14 wherein said transistor switches of each of said plurality of signal channels are driven such that each of said channels are sequentially driven for a period of at least one cycle of said desired chopped frequency.

16. A circuit as set forth in claim 8 wherein said adjustable impedance comprises a potentiometer having a resistor with one end connected to one of said transistor switches and another end connected to the other of said transistor switches, said potentiometer having a movable wiper tap electrically coupled to the input side of said amplifier stage for feeding thereto a voltage the magnitude of which is dependent upon the setting of said wiper tap, and said common mode rejection and gating stage further comprising transformer means for isolating said transistor switch and said resistor from said transistors.

17. A multiplex system as set forth in claim 14 wherein said adjustable impedance comprises a potentiometer having a resistor with one end connected to one of said transistor switches and another end connected to the other of said transistor switches, said voltage source coupled to said transistor switches so that a voltage level of opposite polarity is applied to each end of said resistor when one of said transistors is conducting and the polarities thereof are reverse when the other of said transistor switches is conducting, said potentiometer having a movable wiper tap connected to said input means, and said common mode rejection and gating stage further comprising transformer means for electrically isolating said transistor switches and said resistor from said transistors.

References Cited by the Examiner

UNITED STATES PATENTS

| | | | |
|---|---|---|---|
| 3,011,129 | 11/1961 | Magleby et al. | 328—101 |
| 3,089,921 | 5/1963 | Hines | 179—15 |
| 3,106,433 | 10/1963 | Meadows | 328—101 |

DAVID G. REDINBAUGH, *Primary Examiner.*

T. G. KEOUGH, R. L. GRIFFIN, *Assistant Examiners.*